March 1, 1932. J. SCHMIDT 1,847,309
VEGETABLE WASHING MACHINE
Filed Jan. 21, 1926   4 Sheets-Sheet 1
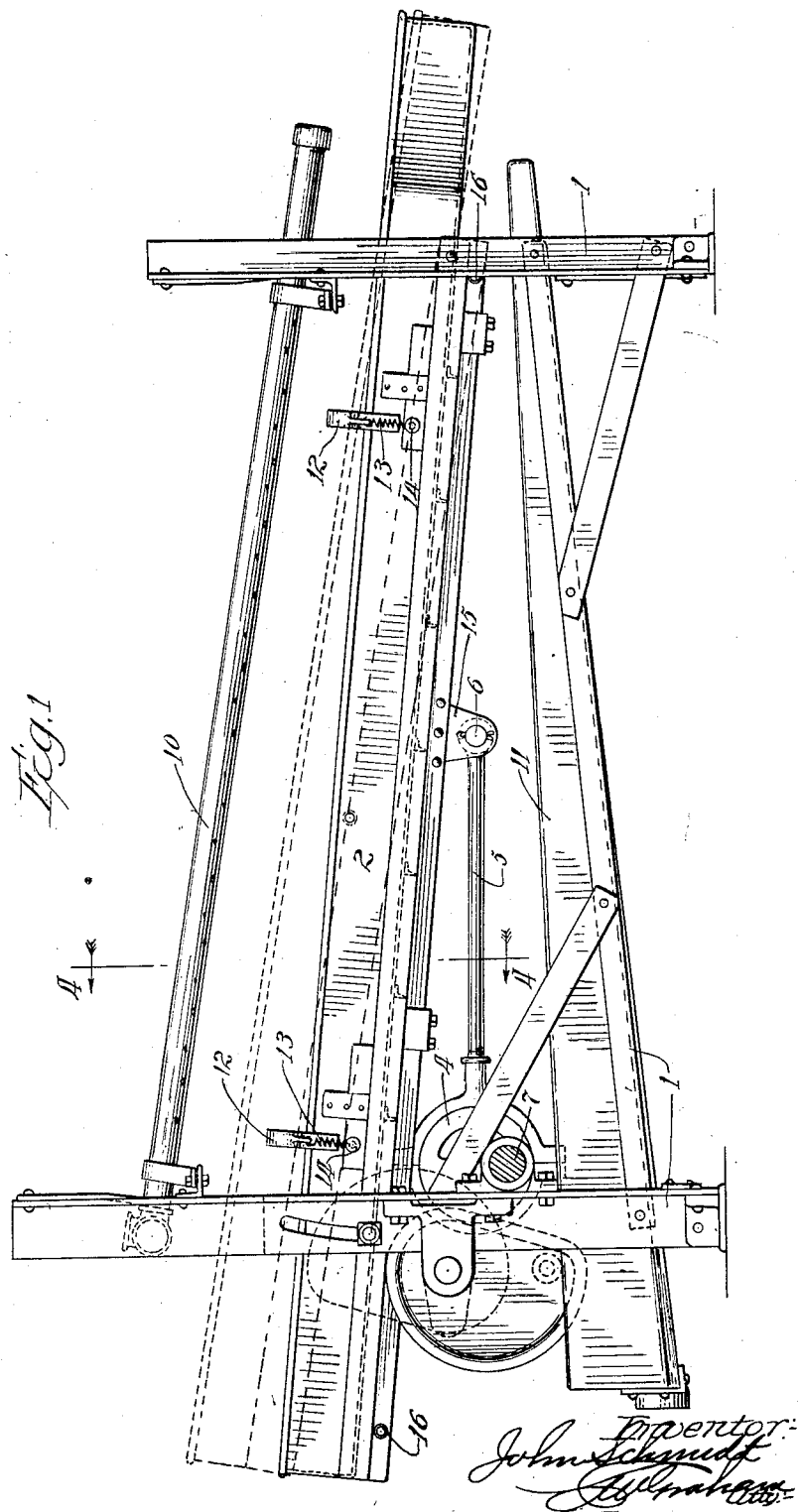

March 1, 1932. J. SCHMIDT 1,847,309
VEGETABLE WASHING MACHINE
Filed Jan. 21, 1926 4 Sheets-Sheet 2
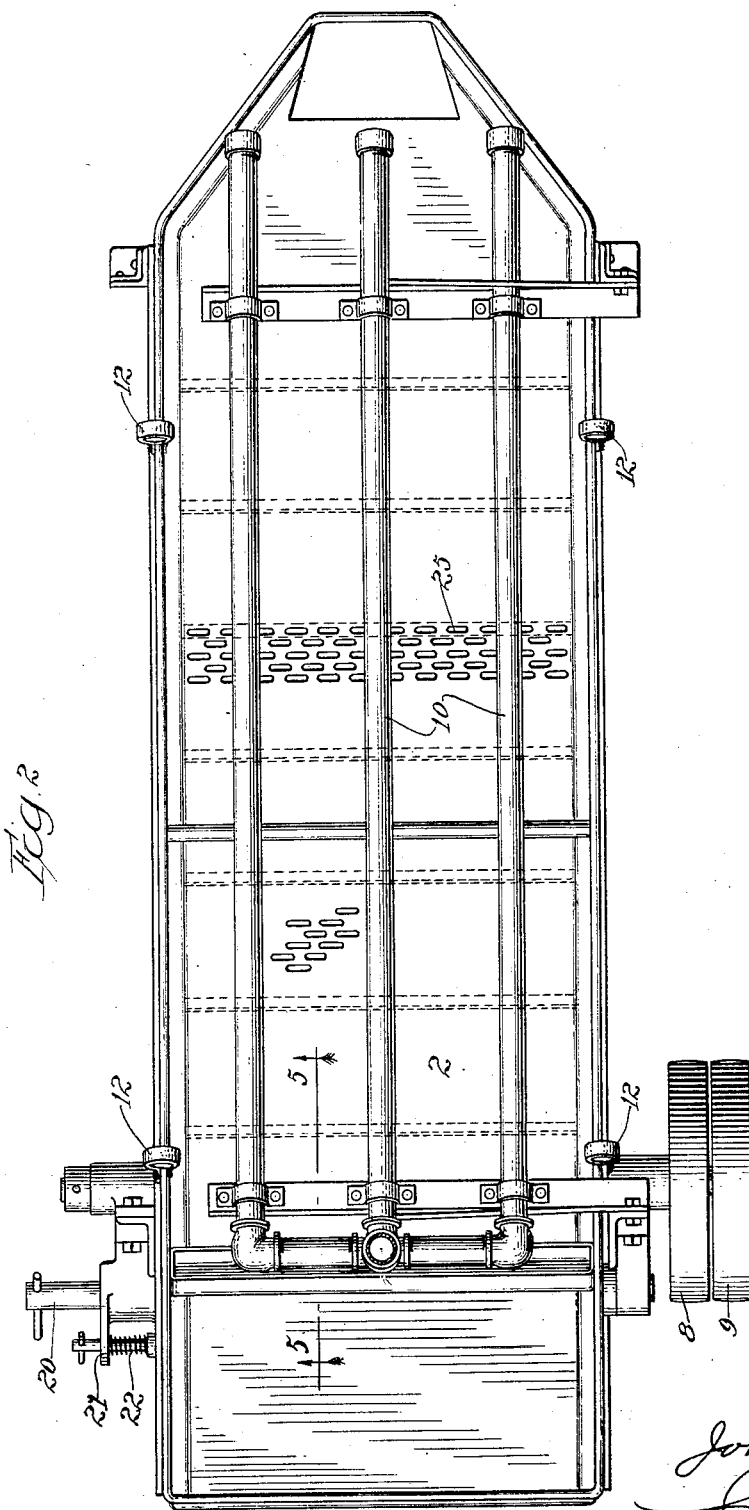

March 1, 1932. J. SCHMIDT 1,847,309
VEGETABLE WASHING MACHINE
Filed Jan. 21, 1926 4 Sheets-Sheet 3
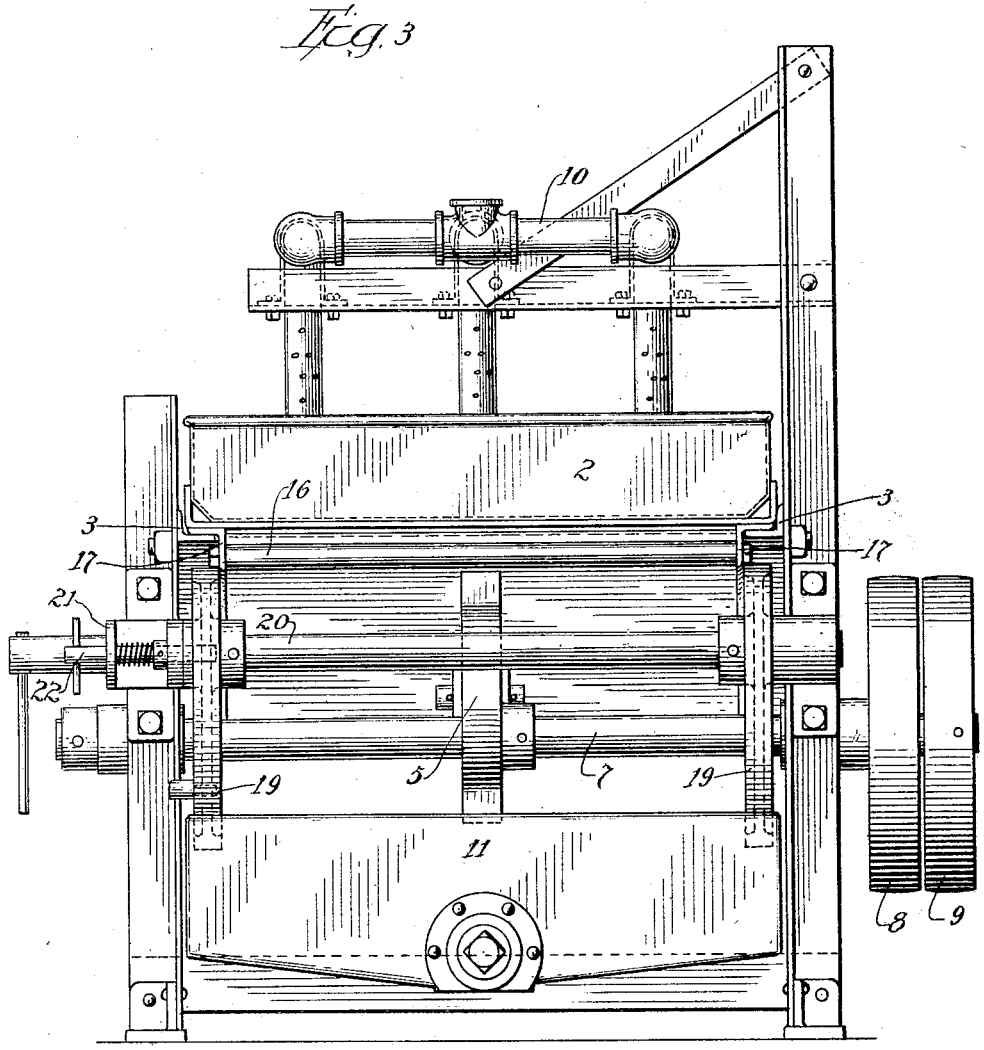

March 1, 1932.  J. SCHMIDT  1,847,309
VEGETABLE WASHING MACHINE
Filed Jan. 21, 1926  4 Sheets-Sheet 4
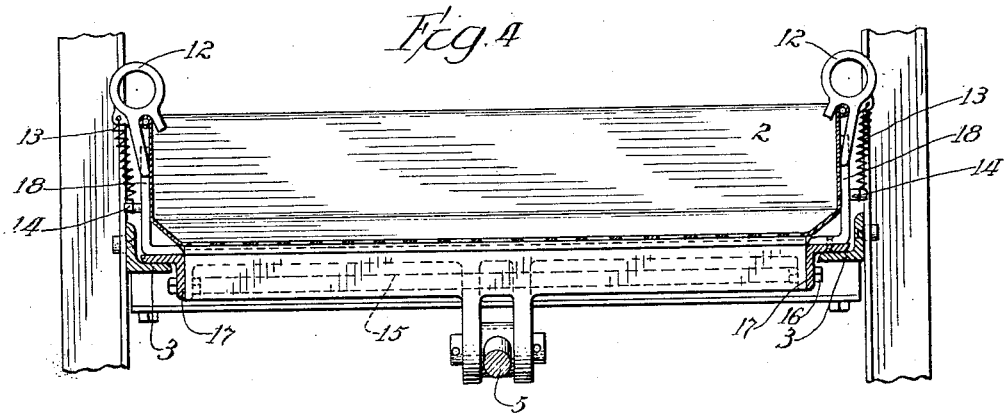
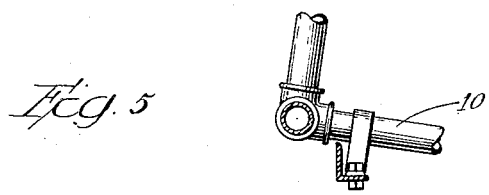
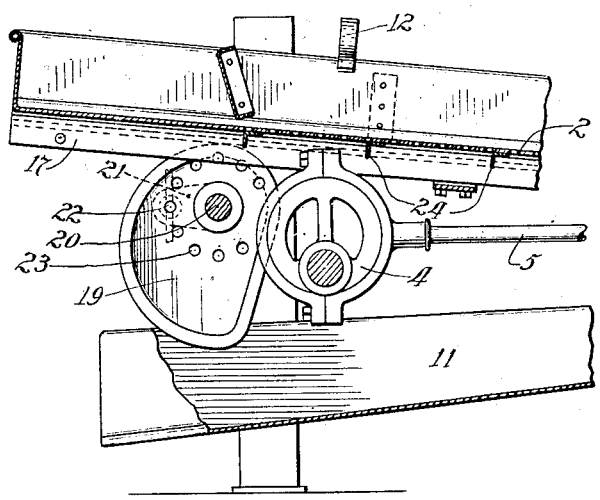
Inventor:
John Schmidt Patented Mar. 1, 1932

1,847,309

UNITED STATES PATENT OFFICE

JOHN SCHMIDT, OF HOOPESTON, ILLINOIS, ASSIGNOR TO SPRAGUE-SELLS CORPORATION, OF HOOPESTON, ILLINOIS

VEGETABLE WASHING MACHINE

Application filed January 21, 1926. Serial No. 82,701.

The invention relates to an improved apparatus for washing, grading and sifting peas, beans and like materials and contains features of design and construction that enable it to produce a much superior result than has heretofore been possible.

The handling of peas and beans in the commercial cannery requires apparatus having high capacity and efficiency, and in the handling of such product there is more or less of mutilation resulting in what is technically termed "splits", bruised and separated skins, and other crushed particles, all of which it is desirable to separate from the selected product that goes in the sealed containers, and at the same time effect a grading of the product by segregating the different sizes to thereby produce a more uniform and salable product.

The present apparatus used in the attempt to gain these desirable results has been found to be more or less inefficient on account of structural deficiencies and faulty design.

In treating peas, for example, these come from the viners or threshers in mixed bulk of assorted sizes, varying degrees of growth and development, mixed with some refuse composed of scraps of pods, vines, leaves and some foreign matter and vegetative growths as well as some split peas. In order to produce a marketable product of high quality from this conglomerate mass it is necessary to pass it through some kind of grading, sifting and separating means, whereby peas of a size are segregated into groups and the crushed and split peas and refuse matter is segregated into other groups for final disposal.

The desired grading, sifting and separating is usually attempted by passing the mass over vibrating screens having perforations of a size suitable for the size and kind of product being handled.

The faulty design and construction in present day devices has operated to prevent a thorough grading and separation of the mixed mass of material so that the finished product has not been up to expectation or desire.

It is a principal object of my present invention produce a grading, cleansing and separating apparatus for the special kinds of product mentioned that will contain in its design, new and improved features that will accomplish the things desired of such apparatus but that heretofore have been unavailable.

One of the desired results that has been only partially realized is the complete separation of the "splits", from the mass of material being handled. A split pea is just as large across the "split", as a complete pea, and on account of being a "split", usually rides down the screen on its flat face, thus presenting its full diameter to the screen openings. If the openings are large enough to let the "split" through, they are also large enough to let all the same diameter good peas through which are then lost for that grade.

To facilitate the separation of these "splits" from the perfect peas, the grading or sizing screen holes have been elongated and disposed in staggered relation with the longer axes of the holes lying parallel with the direction of movement of the mass of material along the screen surface. This was done with the idea of giving the "splits", a better opportunity of finding passage therethrough, and in a measure was an improvement over the ordinary round hole. But on account of the split face of the pea being as large in diameter across the split face as the original diameter of the pea many of the "splits" would ride right over the elongated holes and never be separated and would be deposited with the whole peas of this grade and thereby add a contributing factor to lower the quality of the grade.

It is an object of my invention to remedy this defect in the design and construction of grading screens whereby practically all of the "splits", will be separated from the mass and segregated for other disposal.

I accomplish this most desirable result by placing the elongated screen holes with their longer axes at approximately right angles to the path of movement of the mass of material. This apparently simple change produces marked superior results.

With the screen holes so placed it has proven to be practically impossible for a "split" to avoid falling through some one of the holes in its passage down the screen.

While the diameter of the "split", across its face is substantially the same as the complete pea, its diameter in the other direction is substantially only half of its original diameter, and as practically all "splits" ride down the screen on their faces, after coming in contact with the screen, they find difficulty in bridging the space formed by the elongated slot, for, as soon as the split pea has passed partly over the slot the overhanging unsupported portion will tip into the slotted opening and begin its passage therethrough. The elongation of the slot accommodating the larger diameter of the split pea and the normal width of the slot easily passing the lesser diameter. Since there are a very large number of the elongated slots in a grading screen it has been found that sooner or later every "split" will find passage through some one of these slots before the mass of material has completely passed off the screen.

Another trouble encountered by the canner when packing peas is the lack of a rapid and convenient means for changing grading screens to suit the even changing sizes of peas coming through the line. Peas of a certain size and quality may come along for a time, and of a sudden, owing to batches coming from a different field or from another part of the same field, the grade changes to a larger or a smaller pea than the particular screen in the machine is suited for. When this happens it becomes immediately necessary to remove the screen in use and substitute one having holes of a size to suit the grade coming. If so short a time as two or three minutes is required to make this change it means an undue clogging of the line of moving material due to the stoppage, or the rehandling of a part of the continuously moving mass of material until the change is made.

It is an object of my invention to provide a design and construction that will permit of practically instant change of screens.

This desirable result is accomplished by holding each screen in operative position by manually manipulative spring catches. These catches can be grasped and released, the screen removed and another put in place, all in a few seconds, so that practically no time is lost in the change and no serious stoppage of the moving mass of material occurs.

Another trouble encountered by the canner is in the tendency of a mass of moving material to clog or bunch on the vibrating screen. If a lot of small light peas are coming through, the screen needs more inclination to cause the mass to move down the screen at the desired speed, while if a lot of large and comparatively heavy peas are coming through the screen may need to have less inclination to prevent too much speed of movement.

It is an object of my invention to provide manually manipulative means for quickly and accurately adjusting the inclination of the grading screen to suit the material being handled.

Another very serious trouble encountered by the canner when handling peas, has been the separation of the skins and other light material in the mass. All of this refuse would ordinarily pass through the screen openings in its movement down the screen if there were no obstructions in its path.

In the operation of these grading machines, jets of water are projected down on top of the mass of material to wash out the adhering dirt and other refuse matter and to assist in forcing the dirt, split peas and other matter through the slotted openings of the screen. This water trickles down through the mass and through the screen and forms a water film on the under side of the vibrating screen as it runs to the lower end, and in forming this film it most effectually bridges across the elongated openings and acts as a seal to form a complete barrier to the free passage of the skins and other light material that it is desired to separate, and unless this water seal is broken this refuse material cannot pass through.

It is an object of my invention to provide a design and construction that will prevent the formation of this water film and seal on the under side of the screen and thus permit a free and unobstructed passage of the refuse material and skins through the screen openings.

With such objects in view as well as other advantages inherent in the invention, the novel structural peculiarities, novel organization of elements, and the separate and collective operations involved in carrying out the recited objects of my invention, which will be made the subject matter of claims hereto appended, I wish it understood that the several necessary elements and combinations constituting the same may be varied in their proportions, placement, general arrangement and operative positions without departing from the nature and scope of my invention.

In carrying out the objects of my invention in a concrete form or machine, further objects, advantages and improvements have been evolved than have been recited, and in order to make the invention more clearly understood there are shown in the accompanying drawings, means and mechanism embodying the preferred structural arrangement and the preferred disposition of the different parts and combinations, in which I have simply illustrated one way of embodying the creative part or concept of the invention in a concrete form or machine and in doing so I do not wish to limit the claims to the exact details of construction shown. The described devices are simply embodiments of the invention which other structures might also employ and some of the parts and combinations may be used without the others in different types of such machines without departure from the purview of my invention and I regard myself as entitled to such variations from the shown and described devices as fall within the scope and meaning of the claims hereto appended.

Reference being now had to the accompanying drawings a clearer and better understanding of the arrangement and operation of a machine embodying my invention will be had, wherein:

Fig. 1 is a side elevation of the machine with parts omitted to clearly show the operative mechanism.

Fig. 2 is a plan of Fig. 1 clearly showing the manner of perforating the screen and the location of the various operative elements of Fig. 1.

Fig. 3 is an end elevation showing the left end of the machine of Fig. 1.

Fig. 4 is a sectional elevation taken on approximately line 4—4 of Fig. 1 but omitting some parts to clearly show the mounting of the vibratory screen and the manner of holding it in operative position by means of the spring catches.

Fig. 5 is a sectional elevation taken on approximately the line 5—5 of Fig. 2 and clearly shows the watershed means on the under side of the vibratory screen; the cam means for adjusting the inclination of the screen member and the relation of other parts of the apparatus.

Before proceeding with a further description I wish to point out that the drawings accompanying this application are more or less diagrammatic in character; are not necessarily drawn to scale, neither do they necessarily represent the best or the preferred engineering practices in connection with the structural details of machines of this type or nature, also the proportions and relations of some of the parts may be more or less exaggerated in size or shape to better illustrate an application of the invention to an operative machine.

A suitable framework is provided to carry the operative parts of the machine as represented by the numeral 1. The numeral 2 represents a vibratory screen member, having sliding movement on the ways 3, Fig. 4. Vibratory motion is imparted to the screen member 2 by means of the eccentric 4 and rod 5 connected to the bottom of the screen member 2 as at 6. The eccentric is carried by the cross shaft 7, which shaft is also the main drive shaft for the machine, carrying driving pulleys 8 and 9 on its outer end, the source of power is not shown but may be from any suitable source always available where machines of this type are operated.

Arranged directly over the screen member 2 are water pipes having jet openings suitably disposed to project sprays of water down onto the material passing and thus give it a thorough washing, and assist in separating the undesirable material from that, that is to be used for canning purposes, these water pipes are indicated by the numeral 10. Underneath the screen member 2 is located a catch basin or pan for catching the refuse and débris washed from the material as at 11, means being provided for the frequent removal of the débris.

The particular feature of this invention that permits of practically instant change of screen members 2 is best illustrated in Fig. 4, but also shows clearly in some of the other figures. 12 represents finger hold catches which hook over the top edge of the screen member 2 and are securely held in place by means of the springs 13, carried by the fixed pins 14. The screen member 2 rests freely in the vibrating frame member, 15 comprising the cross member of Fig. 4 and 16 comprising tie rods, and 17 side angle members. 18 represents retaining plates that hold the screen member in lateral alignment, the fixed pins 14 are carried by the retaining plates 18.

When it becomes necessary to quickly change screens during operation the finger hold catches 12 are grasped and lifted off the top edges of the screens and the screens quickly lifted out and another screen put in place. This can be done so quickly with two operators that there is only a momentary stoppage of the flow of material, not sufficient to necessitate rehandling by removing it from the conveyor system. The screen is made of thin sheet material and is not heavy and the material being treated that is in the screen is in a comparatively thin layer so that it is not very heavy. The material that is removed with the screen may be dumped back into the coming mass and again passed over the screen.

The particular feature of this invention that permits of instant change of the inclination of the vibratory screen is best illustrated in Fig. 5. As has previously been pointed out, at times it becomes desirable to change the inclination of the screen to cause a proper flow of material to get best results of operation. This change may be accomplished while the machine is in operation and without any stoppage whatever. The rearward end of the vibratory frame member rests on two cams 19, secured to the cross shaft 20. One end of this cross shaft extends through the machine as shown in Fig. 2 and has a small bar secured therethrough to act as a hand hold during manipulation. The bearing block for the shaft 20 on this end carries an arm 21 which in turn carries a retaining pin 22, which finds bearing in any one of a series of holes 23 in the cam 19. In order to adjust the inclination of the screen 2 the operator grasps the pin 22 and withdraws it from the cam 19 and by means of the hand hold on the shaft 20 turns the two cams 19 in either direction to effect the adjustment desired and then reinserts the pin 22 into the hole 23 that is in alignment with the pin. This adjustment can be made as frequently as may be desired during a day's run and thereby always keep the mass of material moving over the screen in the desired manner to get best results.

The manner of breaking the water film and seal on the under side of the screen bottom is accomplished by means of a series of breaker bars 24, Fig. 5, secured at frequent intervals across the bottom surface of the screen.

On account of the inclination of the screen any water passing therethrough will naturally run down the incline on the under side and in doing so a thin film bridges across the screen openings and completely seals the openings against the passage of light material like the skins, pieces of leaves or vines or other small and light matter. This has been a very serious matter and a problem that has been hard to solve and it has only been through extensive observation and experiment that the cause of the trouble was finally located.

By placing the small angle bars 24 across the bottom of the screen at proper and sufficient intervals the water film is broken and does not run down the screen as before, but is trapped by the bars and drained off, so that the small amount of water between bars is not sufficient to form the seal as has been the case before.

Fig. 2 illustrates the manner of placing and arranging the elongated slots 25 which is so very effective in removing the "splits" as has been described. The entire screen bottom is perforated in this manner, but only a portion has been shown so perforated in the drawings. These openings are spaced, staggered and are of the various sizes necessary to properly handle the various sizes of peas coming through in the day's run.

The machine illustrated is properly a washing machine, although I have at the same time called it a grading and sifting machine. The machine as illustrated will grade and sift two sizes of peas or like products as well as act as a washer.

What I claim as new and desire to secure by Letters Patent is:

1. An apparatus for washing, grading and separating undesirable materials from a mass of mixed peas or like product comprising a screen member for supporting and conveying said material, elongated openings in said screen member arranged in overlapping staggered relation for grading and separating said materials, liquid means for assisting in said grading and separating and means adjacent said screen member for preventing said liquid means from closing the said elongated openings and thereby interfere with the free movement of material therethrough.

2. An apparatus for washing, grading and separating undesirable materials from a mass of peas or like product comprising a member for supporting a mass of peas and other material, elongated openings in said member arranged in overlapping staggered relation, liquid means for assisting in the treatment of materials on said member, interrupting flights on the under side of said member to break the film of liquid forming thereon in the process of washing to thereby maintain the openings in said member free of obstruction from the said liquid film so as to permit of a free and unobstructed passage of the undesirable materials therethrough.

3. An apparatus for washing, grading and separating undesirable materials from a mass of mixed peas and other matter comprising a member for supporting a mass of material to be treated, openings in said member arranged in overlapping staggered relation and proportioned relative to the individual particles of said mass to permit the passage of undesirable particles but to prevent the passage of the desirable particles, liquid means to assist in the washing of said material, breaker strips on the under side of said member for disrupting the liquid film tending to form thereon and close the openings, with means for moving said member to impart movement of said material thereover.

4. An apparatus for washing, grading and separating undesirable materials from a mass of peas or like product comprising a member for containing and treating said mass of material, said member having a bottom and side walls, elongated perforations in the main portion of the bottom of said member arranged in staggered relation with ends overlapping and a discharge opening in the end of the bottom of said member, liquid means above said member for assisting in the treatment of material and breaker strips on the under side of said member for preventing the formation of a liquid film over the said elongated openings, means for imparting movement to said member and means for holding said member in an inclined position.

5. An apparatus for washing, grading and separating undesirable materials from a mixed mass of peas or like product comprising a container for holding a mass of material, elongated openings in the bottom of said container arranged in staggered overlapping relation, liquid means adjacent said container for assisting in the treatment of material, obstructive means on said container for preventing the formation of a liquid film over said openings, means for moving said container to in turn impart movement to the material carried thereby and means for holding said container in an inclined position.

6. An apparatus for washing, grading and separating undesirable material from a mixed mass of peas or like product comprising means for holding and conveying a mass of material, elongated openings in said means arranged in staggered overlapping relation, liquid means operating in conjunction with said holding means in the treatment of said material, obstructive means adjacent said holding means for preventing the formation of a liquid film over said elongated openings, means for holding said holding means in an inclined position and means for vibrating said holding means.

7. An apparatus for treating materials comprising a member for supporting a mass of material, a support for said member permitting movement relative thereto, elongated openings in said member arranged in staggered overlapping relation with their longer axes at right angles to the line of movement of material in said member, means for vibrating said member, means for adjustably holding said member in an inclined position comprising a manually rotatable cam device for engaging the said support for said member and elevating or lowering it to bring the said member to the proper inclination for the material being handled.

8. An apparatus for treating materials comprising a member for supporting and treating a mass of material, elongated openings in said member for the passage of undesirable material said openings being arranged in staggered overlapping relation and with their longer axes positioned at approximately right angles to the line of travel of the mass of material over said supporting member, liquid means for assisting in the treatment of said material, obstructive means for preventing the formation of a liquid film over said openings, cam means for supporting one end of said material supporting member, manually manipulative means associated with said cam means for adjusting the inclination of said member, and means for imparting movement to said member to agitate said material.

9. An apparatus for separating granular materials comprising a member having side walls and a perforated bottom, an inclined vibratory frame member for carrying said perforated bottom member, laterally disposed baffle plates on the under side of said perforated member, water supply means adjacent said members to assist in the separation operation, yieldingly mounted means for holding said perforated bottom member in fixed relation with said vibratory frame member, hand operated means for controlling the inclination of said frame member and mechanical means for imparting vibratory movement to said parts.

10. An apparatus for separating granular materials comprising a screening member consisting of separable parts, one of which comprises a removable screen section and the other of which comprises a fixed vibratory section normally operating in an inclined position, hand operated means for controlling the inclination of said section and which may be manipulated while the said section is vibrating, hand operated means for yieldingly holding said sections together to operate as a single unit, mechanical means for imparting vibratory motion to said unit, a water supply adjacent said unit with means for projecting sprays thereon to assist in the separation of material thereon, with means on said unit for breaking the stream flow and thereby permit of a more perfect separation of the materials.

11. An apparatus for treating granular material comprising a treating member mounted for vibratory movement, means for imparting vibratory movement to said member, a liquid supply falling on material on said member, openings in said member to pass undesirable material with the flow of liquid therethrough, transverse members associated with said treating member and located on the underside thereof to interrupt and break the flow of water therealong to prevent the formation of water films across the openings and thereby give unobstructed passage to the material passing therethrough.

In testimony whereof I affix my signature.

JOHN SCHMIDT.